United States Patent [19]
Spoo

[11] Patent Number: 5,973,019
[45] Date of Patent: Oct. 26, 1999

[54] PEROXIDE BLEND COMPOSITIONS AND METHODS FOR CURING POLYESTER RESINS

[75] Inventor: Kevin J Spoo, Granville, Ohio

[73] Assignee: Flowtite Technology AS, Sandefjord, Norway

[21] Appl. No.: 09/070,879

[22] Filed: May 1, 1998

[51] Int. Cl.[6] ................................................. C08F 2/46
[52] U.S. Cl. ........................... 522/24; 528/486; 528/489; 528/493; 528/495; 522/30; 522/33; 522/36; 522/79
[58] Field of Search .................... 528/486, 489, 528/493, 495; 522/24, 30, 33, 36, 79

[56] References Cited

U.S. PATENT DOCUMENTS

| | | | |
|---|---|---|---|
| 4,042,646 | 8/1977 | Edamura et al. | 525/22 |
| 4,474,868 | 10/1984 | Yamaoka et al. | 430/281 |
| 4,940,648 | 7/1990 | Geiger | 430/272 |
| 5,412,003 | 5/1995 | Akiyama et al. | 523/513 |
| 5,691,394 | 11/1997 | Kondo | 522/29 |

OTHER PUBLICATIONS

"TOC–Reduction by Optimsed Curing Systems" by Dr. Hanno Wolf dated Oct. 1997 MSDS No. 11–066216 Akzo Nobel Chemicals Inc., Trigonox 40K.

*Primary Examiner*—Samuel A. Acquah
*Attorney, Agent, or Firm*—C. Michael Gegenheimer; Inger H. Eckert

[57] ABSTRACT

This invention relates to a method of curing unsaturated polyester resins or mixtures of such resins and a monomer copolymerizable therewith. More particularly, the invention relates to the curing of such resins and mixtures thereof with a composition comprising acetylacetone peroxide (AAP) in an amount of from about 30 to about 35 percent and a high temperature peroxide. Preferably, the high temperature peroxide is t-butyl peroxybenzoate (TBPB) and is present in an amount of from about 5 to about 10 percent of the composition.

18 Claims, 3 Drawing Sheets

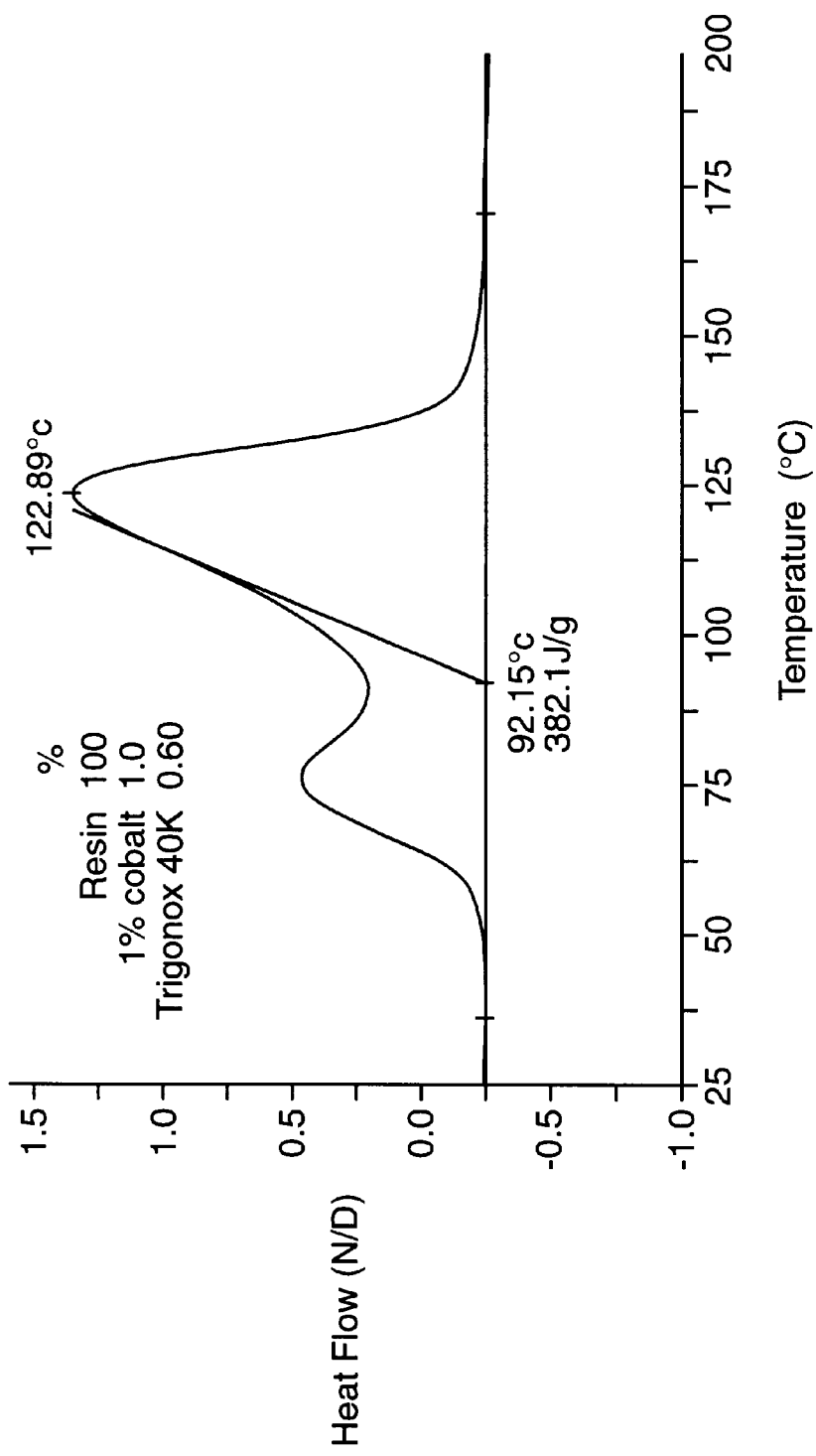

PEROXIDE BLEND COMPOSITIONS AND METHODS FOR CURING POLYESTER RESINS

This invention relates to a method of curing unsaturated polyester resins or mixtures of such resins and a monomer copolymerizable therewith. More particularly, the invention relates to the curing of such resins and mixtures thereof with a composition comprising acetylacetone peroxide (AAP) and a high temperature peroxide. The compositions and curing method of the invention are particularly useful in the manufacture of GRP pipe produced via a continuous filament winding process. The invention results in manufacturing rate increases of as much as 60%.

BACKGROUND OF INVENTION

Polyester resin, as the term is used, designates a linear-type alkyd possessing unsaturation in the polymer chain. These unsaturated polyesters may be crosslinked by reaction with monomers such as styrene, acrylates or diallyl-phthalate usually in the presence of a peroxide to form insoluble and infusible resins without the formation of a by-product during the curing reaction. Polyester resins possess broad commercial utility due to their versatility and cost effectiveness. As a result of the increased applications, it has become essential to increase the cure rates of such polyester resins at low temperatures without detracting from the physical properties of the resins.

Although previous technology has used acetyl acetone peroxide to effect a rapid room temperature cure of polyester resins, the full cure of the part has suffered resulting in residual styrene contents which are no better and often worse than the routine methyl ethyl ketone peroxide (MEKP) cured systems.

Thus, there is a need for more effective initiators and cure promoters which will provide a fast cure without adversely affecting the physical properties of the cured resins.

SUMMARY OF THE INVENTION

These needs are met by the present invention in which a peroxide blend composition is provided for rapidly curing polyester resins. It is a primary object of the invention to provide a composition useful for rapidly curing polyester resins at lower temperatures than is currently used for methyl ethyl ketone peroxide. In particular, the composition of the present invention thoroughly cures GRP pipes manufactured in the continuous filament winding process.

In one embodiment of the invention, the composition of the present invention relates to a peroxide blend composition comprising acetylacetone peroxide in an amount of from about 30 to about 35 percent and a high temperature peroxide, wherein the peroxide blend composition is effective in obtaining a high completion of cure of the resin having a low residual styrene content. The low residual styrene content of the resin cured with the peroxide blend composition of the present invention is preferably less than 1%.

In a preferred embodiment, the high temperature peroxide is t-butyl peroxybenzoate, which is present in an amount of from about 5 to about 10 percent of the total composition.

In yet another preferred embodiment of the invention, acetylacetone peroxide is present in an amount of 30% percent of the total composition and t-butyl peroxybenzoate is present in an amount of 10%. Thus, the preferred ratio of acetylene peroxide to t-butyl peroxybenzoate is 30:10.

The composition of the present invention may contain stabilizers such as diacetone alcohol or n-methyl-2-pyrrolidone and other diluents.

In another embodiment of the invention, a method of curing polyester resins is provided, wherein the curing process is carried out in the presence of the composition of the present invention.

These and other objects of the present invention will become apparent from the following general and detailed description of the invention.

BRIEF DESCRIPTION OF THE DRAWINGS

FIG. 3, when compared to FIG. 2, shows that the release of exothermic energy is accomplished more evenly with a small amount of TBPB in FIG. 2, whereas in FIG. 3, the release occurs in the latter portion of the cure cycle. The curing manner of FIG. 3 should be avoided in thick cross-section parts.

DETAILED DESCRIPTION AND PREFERRED EMBODIMENTS OF THE INVENTION

Figure 1:
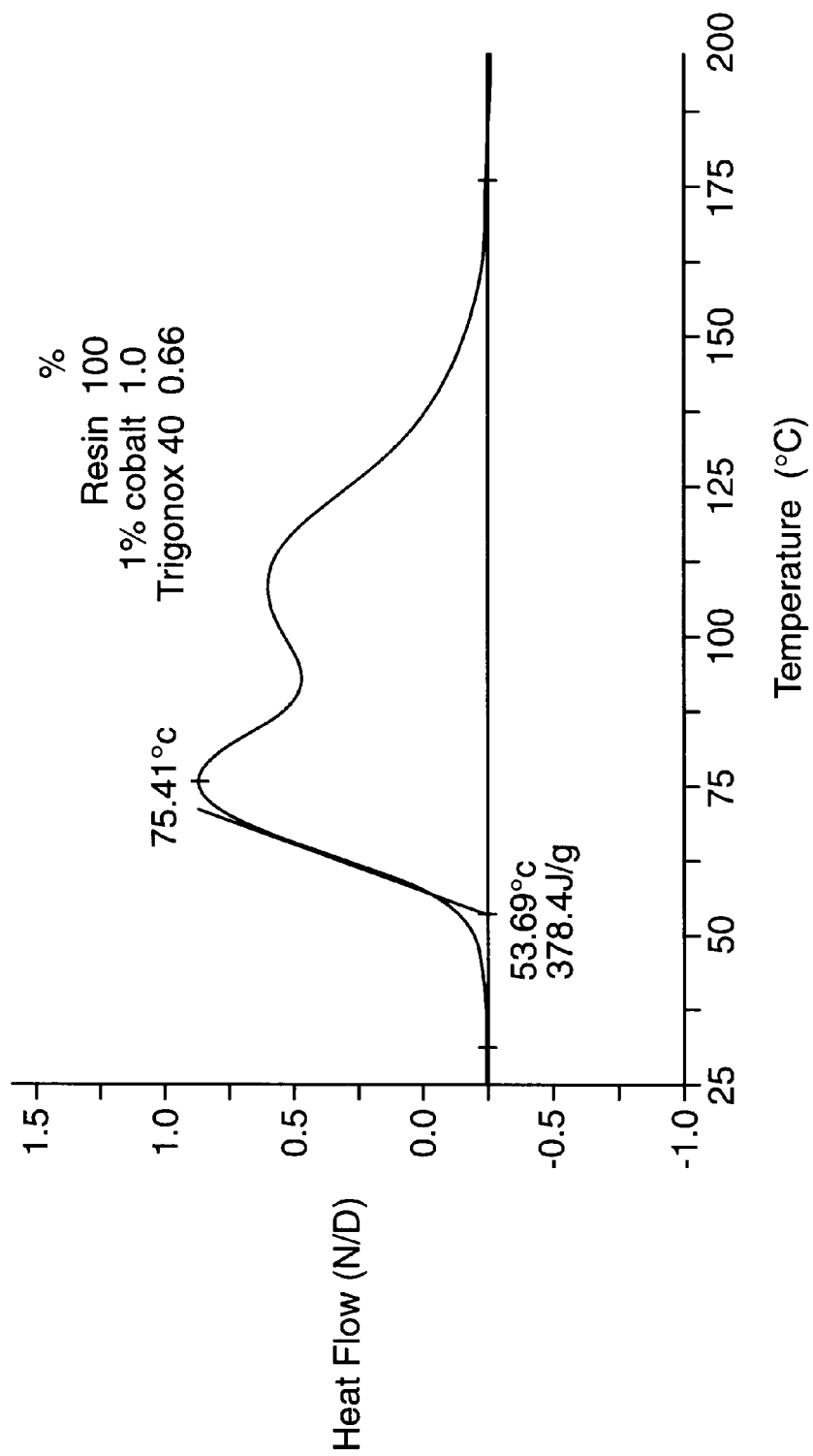
FIG. 1 is a differential scanning calorimetry (DSC) graph that shows the onset of curing is favorable with curing at elevated temperatures being indistinct.
Figure 2:
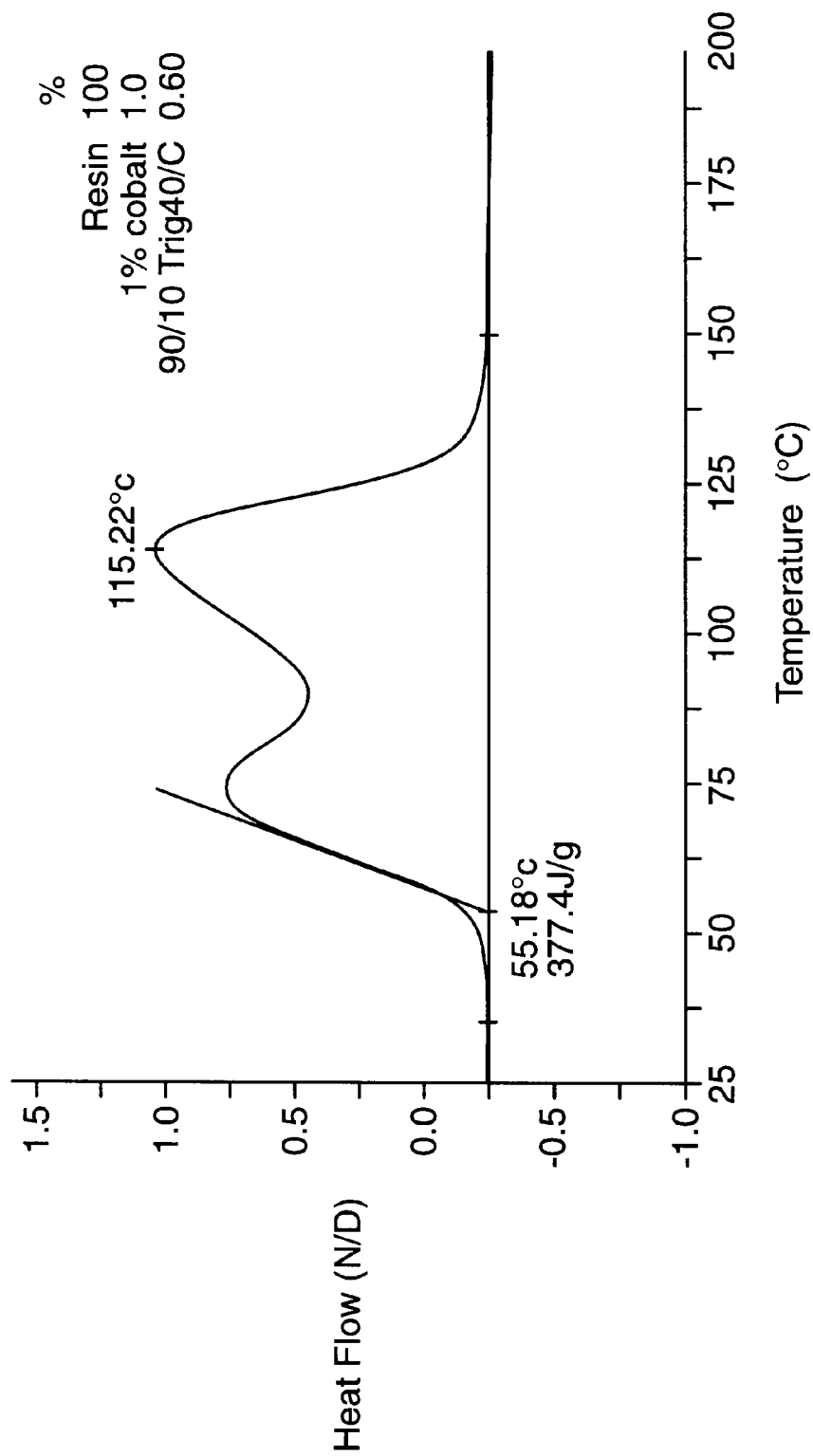
FIG. 2 is a DSC graph showing that the addition of a small amount of TBPB results in a crisp finish to the cure and a return to baseline at a lower temperature than in FIG. 1.

The peroxide blend composition of the present invention allows polyester resins to be cured rapidly and at lower temperatures than the temperature at which methyl ethyl ketone peroxide is used as the peroxide initiator. The peroxide blend composition of the present invention permits the curing process to be conducted at an ambient temperature of from about 10° C. to about 45° C., and preferably at a temperature of from about 20° C. to about 35° C.

The peroxide blend composition of the present invention is useful in the curing of unsaturated polyester resins. Unsaturated polyesters resins are widely used in the field of composite materials such as, for example, castings, paintings and glass fiber reinforced products. The polyester resins cured in the presence of the peroxide blend composition of the present invention may be used in any of the typical applications for composite materials, which currently use MEKP and do not require a trimming operation. Applications include resin transfer molding, casting, and resin injection molding.

The unsaturated polyester resins may be obtained by known methods, such as by esterifying an unsaturated polybasic acid/anhydride and/or a saturated polybasic acid/anhydride with a polyalcohol. Suitable polyvalent alcohols include, but are not limited to, ethylene glycol, diethylene glycol, triethylene glycol, trimethylene glycol, propylene glycol, pentaerythritol, and other diols or polyols. Suitable unsaturated polybasic acid/anhydride include, but are not limited to maleic acid, maleic anhydride, fumaric acid, itaconic acid, or citraconic acid. Suitable saturated polybasic acids/anhydrides include, but are not limited to phthalic acid, phthalic anhydride, isophthalic acid, tetrachlorophthalic acid, malonic acid, adipic acid, sebacic acid, tartaric acid and tetrahydrophthalic acid, etc.

As used herein, the term "peroxide blend composition" refers to a blend of acetylacetone peroxide (AAP) in an amount of from about 30 to about 35 percent of the total composition and a high temperature peroxide. Generally, the commercially available products containing AAP also possess other diluents as well. Thus, the amount of AAP used in the composition of the present invention should be based upon the actual amount of AAP present in the commercially available product. For example, suitable AAP products include Akzo Trigonox 40, Akzo Trigonoz 44B, Elf Atochem Lupersol 224, and Peroxid-Chemie AAP-NA-2. The formulations for Akzo Trigonox 40, Akzo Trigonox 44B, and Elf Atochem Lupersol 224 are provided in Table 1.

TABLE 1

Formulations of Commercially Available AAP Products

| Ingredients | Akzo Trigonox 40 used in U.S. | Akzo Trigonox 44B used in Europe | Elf Atochem Lupersol 224 | Akzo Trigonox 40 K |
|---|---|---|---|---|
| Acetylacetone peroxide | 34 | 33 | 34 | 24.0 |
| 2,4-pentanedione | — | — | 2 | — |
| t-butyl peroxybenzoate | — | — | — | 10.0 |
| Dimethylphthalate | 16 | — | — | 34.0 |
| n-methyl-2-pyrrolidone | — | — | 14 | — |
| Diacetone alcohol | 33 | 50 | 31 | 24.0 |
| Hydrogen peroxide | 3 | 7 | — | 2.0 |
| Diethylene glycol | 8 | 12 | 8 | 6.0 |
| Water | 6 | 5 | 10 | — |
| Acetic acid | — | — | 1 | — |
| Total | 100 | 100 | 100 | 100 |

As used herein, the term "high temperature peroxide" refer to peroxyesters, which reduce the residual styrene content of polyester resins in various molding applications. Suitable high temperature peroxides include, but are not limited to, t-butyl peroxybenzoate, 2,5-dimethyl-2,5-di(2-ethyl hexanoyl peroxy) hexane, t-butyl peroxy-2-ethyl hexanoate, t-butyl peroxy-3,5,5-trimethyl hexanoate, t-butyl peroxy isopropyl carbonate, and t-amyl peroxy (2-ethylhexyl) carbonate, for example. Each of these compounds are commercially available. In a preferred embodiment, the high temperature peroxide is t-butyl peroxybenzoate (TBPB), which is present in the composition in an amount of from about 5 to about 10 percent of the total composition. In a particularly preferred embodiment, TBPB is present in an amount of 10 percent of the total peroxide blend composition.

The effective amount of the high temperature peroxide to be used in the peroxide blend composition of the present invention is that amount, which in combination with the from about 30 to about 35 percent AAP, is effective in obtaining a cured resin having a low residual styrene content. In a preferred embodiment, the amount of high temperature peroxide suitable for other molding applications is one which reduces residual styrene levels and improves thermal and mechanical properties while minimizing the amount of extractable high temperature peroxide or decomposition products therefrom. Prior to this invention, residual styrene contents could be obtained in an amount of 1.5 to about 2.0 percent. However, a "low residual styrene content" as used herein refers preferably to an amount of less than about 1 percent residual styrene content. Since the residual styrene content may differ between different methods of manufacture, i.e., different molding applications, the residual styrene content as used herein refers to the resin used in the filament winding process. The residual styrene content of the cured resin may be measured by known methods such as by a combination of acetone extraction and gas chromatography.

In addition to the AAP and high temperature peroxide, the composition of the present invention may contain stabilizers, which act to stabilize the peroxides in the composition. Suitable stabilizers include, but are not limited to, n-methyl-2-pyrrolidine and diacetone alcohol. In a preferred embodiment, the stabilizer is diacetone alcohol.

Furthermore, other diluents may be added to the composition. For example, hydrogen peroxide, diethylene glycol, 2,4-pentandione, and water may be added to the composition as needed.

In preparing the peroxide blend composition of the present invention, the sequence of adding the AAP and high temperature peroxide blend to the unsaturated polyester resin is not critical.

In a preferred embodiment of the present invention, the peroxide blend compositions of the present invention have the formulations provided in Table 2.

TABLE 2

| Ingredients | approximate % | approximate % |
|---|---|---|
| Acetylacetone peroxide | 30.0 | 30.0 |
| t-butylperoxybenzoate | 10.0 | 10.0 |
| Dimethylphthalate | | 45.0 |
| n-methyl-2-pyrrolidone | | |
| Diacetone alcohol | 45.0 | |
| Hydrogen peroxide | 1.0 | 1.0 |
| Diethylene glycol | 10.0 | 10.0 |
| Water | 4.0 | 4.0 |
| Total | 100 | 100 |

A method of curing polyester resins comprising carrying out the curing process in the presence of a composition comprising acetylacetone peroxide in an amount of from about 30 to about 35 percent of the total composition and a high temperature peroxide is further provided. The composition used in this method is described above. Preferably, the curing process is conducted at an ambient temperature of about 20° C. to about 35° C. Additional heat may be provided and is preferred when parts having a thickness of less than 6 mm (¼") are being cured.

The reactivity of the unsaturated polyester resin may be determined by several different methods as is well known in the art. For example, a gel test may be conducted to determine the gelation time, reaction time, and exothermic peak of the cure. These factors provide information as to how efficiently and effectively an unsaturated polyester resin is cured using the formulations of the present invention.

In order that the invention may be more readily understood, reference is made to the following examples, which are intended to be illustrative of the invention, but are not intended to be limited in scope.

EXAMPLES

Examples 1–6

Formulations were made having various ranges of acetylacetone peroxide, t-butyl peroxybenzoate, and methyl ethyl ketone. The acetylacetone peroxide compositions had the formulations provided in Table 3.

TABLE 3

| Ingredients | FC-100 % | Akzo Trig 40 K % | Trig 40/Trig C 90/10 % | Trig 40/Trig C 75/25 % | Trig 40/Trig C 50/50 % |
| --- | --- | --- | --- | --- | --- |
| Acetylacetone peroxide | 30 | 24 | 30.6 | 25.5 | 17 |
| t-butylperoxybenzoate | 10 | 10 | 10 | 25 | 50 |
| Dimethylphthalate |  | 34 | 14.4 | 12 | 8 |
| Diacetone alcohol | 45 | 24 | 29.7 | 24.7 | 16.5 |
| Hydrogen peroxide | 1 | 2 | 2.7 | 2.3 | 1.5 |
| Diethylene glycol | 10 | 6 | 7.2 | 6 | 4 |
| Water | 4 |  | 5.4 | 4.5 | 3 |
| Total | 100 | 100 | 100 | 100 | 100 |

Commercially available methyl ethyl ketone having the trade name Cadox M50 (available from Akzo) was used either alone or together with Trigonox C, which has the formulation above.

A test was conducted to determine the reactivity of unsaturated polyester resins (CPP6042 having a viscosity of 300 cps unless otherwise stated) cured in the presence of these formulations. This method provides that curing was conducted with these above-mentioned formulations and a cobalt-octate (1% Co) accelerator at 23° C. 100 grams of the polyester resin was weighted out and tempered to 23° C. An amount of 1% Co was added and mixed well. In addition, an amount of the above formulations was added and mixed well. A 19 mm test tube was filled to a level of 8 cm. A thermo-couple was placed in the tube and positioned in the center of the mixture. The test tube was then placed in a foam block at 23° C. The recorder was started and the test was continued until the exothermic peak was reached.

The time was recorded in minutes to determine the time it took to reach the following range of temperatures:
23–35° C.; 23–65° C.; 35-peak; 23-peak exotherm. The peak exotherm was determined in °C.

Several runs were conducted varying the amount of 1% Co, varying the amount of the formulations, and temperatures. The results are provided in the following tables.

In this table, the effect of adding 10% TBPB to MEKP and AAP shows a modest reduction in curing time with an increase in peak exotherm. With MEKP the gel times increased with MEKP levels remaining the same, however with AAP, the level of AAP needed to be reduced in order to maintain gel times equivalent to its MEKP counterpart. Note also the much more rapid cure rate (35-peak) when using AAP. A modest increase in total peroxide for the 90/10 blend of AAP & TBPB is required, while a large increase in total peroxide is required for the 75/25 blend of AAP & TBPB.

Examples 7–11

The formulations of examples 7–11 were prepared and tested to determine the reactivity of unsaturated polyester resins according to the method provided in Example 1.

TABLE 4

Foam Block Tests Using Dual Peroxide Systems

|  | Example 1 | Example 2 | Example 3 | Example 4 | Example 5 | Example 6 |
| --- | --- | --- | --- | --- | --- | --- |
| Resin @ 300 cps g. | 100 | 100 | 100 | 100 | 100 | 100 |
| 1% cobalt g. | 1.00 | 1.00 | 1.00 | 1.00 | 1.00 | 1.00 |
| MEKP (Cadox M50 g. | 1.00 | 0.99 | 1.00 |  |  |  |
| AAP (Trigonox 40) g. |  |  |  | .90 | 0.86 | 0.79 |
| TBPB (Trigonox C) g. |  | 0.11 | 0.33 |  | 0.10 | 0.26 |
| Peroxide Blend Ratio | 100 | 90/10 | 75/25 | 100 | 90/10 | 75/25 |
| 100 g cup GT @ 23 C. min. | 11.4 | 11.7 | 12.5 | 11.0 | 11.2 | 12.7 |
| Foam Block @ 23 C. |  |  |  |  |  |  |
| 23–35 C. | 17.2 | 16.7 | 17.7 | 13.8 | 13.8 | 16.2 |
| 23–65 C. | 24.9 | 24.5 | 25.5 | 16.2 | 16.2 | 18.8 |
| 35-peak | 13.0 | 12.7 | 12.5 | 5.0 | 4.7 | 4.9 |
| 23-peak | 30.2 | 29.4 | 30.2 | 18.8 | 18.5 | 21.1 |
| Peak | 170 C. | 176 C. | 180 C. | 181 C. | 184 C. | 187 C. |

TABLE 5

Foam Block Tests Using Dual Peroxide Systems

|  | Example 7 | Example 8 | Example 9 | Example 10 | Example 11 |
|---|---|---|---|---|---|
| Resin @ 300 cps g. | 100 | 100 | 100 | 100 | 100 |
| 1% cobalt g. | 1.00 | 1.00 | 1.00 | 1.00 | 1.00 |
| MEKP (Cadox M50 g. | 0.72 | 0.75 | | | |
| AAP (Trigonox 40) g. | | | 0.66 | 0.52 | 0.49 |
| TBPB (Trigonox C) g. | | 0.08 | | 0.06 | 0.16 |
| Peroxide Blend Ratio | 100 | 90/10 | 100 | 90/10 | 75/25 |
| 100 g cup GT @ 23 C. min. Foam Block @ 23 C. | 21.1 | 20.5 | 18.2 | 19.4 | 21.5 |
| 23–35 C. | 32.0 | 28.6 | 20.9 | 23.4 | 26.1 |
| 23–65 C. | 42.3 | 38.5 | 23.8 | 26.3 | 29.1 |
| 35-peak | 17.0 | 15.9 | 6.0 | 5.6 | 5.6 |
| 23-peak | 49.0 | 44.5 | 26.9 | 29.0 | 31.7 |
| peak | 163 C. | 171 C. | 176 C. | 181 C. | 182 C. |

In this table the gel time has been lengthened to 20 minutes to determine if curing will be a problem at lower peroxide concentrations. It can be seen that the addition of TBPB results in a more rapid cure (35C-peak) for both peroxides with the AAP showing a significantly faster cure than MEKP. A modest reduction in total peroxide is required for the 90/10 blend of AAP & TBPB, however the 75/25 blend of AAP/TBPB results in a longer gel time and a fast cure. Compressing the release of energy into the latter portion of the cure cycle is to be minimized to avoid exotherm cracking issues during molding operations.

Examples 12–16

The formulations of examples 12–16 were prepared and tested to determine the reactivity of unsaturated polyester resins according to the method provided in Example 1.

TABLE 6

Foam Block Tests Using Dual Peroxide Systems

|  | Example 12 | Example 13 | Example 14 | Example 15 | Example 16 |
|---|---|---|---|---|---|
| Resin @ 300 cps g. | 100 | 100 | 100 | 100 | 100 |
| 1% cobalt g. | 0.50 | 0.50 | 0.50 | 0.50 | 0.50 |
| MEKP (Cadox M50 g. | 1.00 | 1.03 | | | |
| AAP (Trigonox 40) g. | | | 1.00 | 0.85 | 0.79 |
| TBPB (Trigonox C) g. | | 0.11 | | 0.09 | 0.27 |
| Peroxide Blend Ratio | 100 | 90/10 | 100 | 90/10 | 75/25 |
| 100 g cup GT @ 23 C. min. Foam Block @ 23 C. | 19.5 | 18.3 | 19.2 | 18.5 | 19.5 |
| 23–35 C. | 30.0 | 27.9 | 24.3 | 23.2 | 24.1 |
| 23–65 C. | 40.7 | 38.0 | 28.0 | 26.7 | 27.7 |
| 35-peak | 16.8 | 15.5 | 6.8 | 6.2 | 6.0 |
| 23-peak | 46.8 | 43.4 | 31.1 | 29.4 | 30.1 |
| peak | 166 C. | 173 C. | 178 C. | 181 C. | 185 C. |

In this table the effect of a lower cobalt level on peroxide cure was evaluated. The results show that no problem is observed curing at lower cobalt levels with the peroxide blends. Once again a modest reduction in total peroxide usage is observed with the 90/10 blend of AAP & TBPB while a modest increase in total peroxide usage is observed with the 75/25 blend of AAP/TBPB.

Examples 17–20

The formulations of examples 17–20 were prepared and tested to determine the reactivity of unsaturated polyester resins according to the method provided in Example 1.

TABLE 7

Foam Block Tests Using Dual Peroxide Systems

|  | Example 17 | Example 18 | Example 19 | Example 20 |
|---|---|---|---|---|
| Resin @ 300 cps g. | 100 | 100 | 100 | 100 |
| 1% cobalt g. | 0.50 | 0.50 | 1.00 | 1.50 |
| MEKP (Cadox M50 g. | | | | |
| AAP (Trigonox 40) g. | 1.00 | 0.85 | 0.52 | 0.43 |
| TBPB (Trigonox C) g. | | 0.09 | 0.06 | 0.05 |
| Peroxide Blend Ratio | 100 | 90/10 | 90/10 | 90/10 |
| 100 g cup GT @ 23 C. min. Foam Block @ 23 C. | 19.2 | 18.5 | 19.4 | 18.0 |
| 23–35 C. | 24.3 | 23.2 | 23.4 | 21.6 |
| 23–65 C. | 28.0 | 26.7 | 26.3 | 24.2 |
| 35-peak | 6.8 | 6.2 | 5.6 | 5.3 |
| 23-peak | 31.1 | 29.4 | 29.0 | 26.9 |
| peak | 178 C. | 181 C. | 181 C. | 181 C. |

In this table various cobalt levels were evaluated with 90/10 blends of AAP & TBPB. The results show a very favorable reduction in peroxide usage and a reduction in cure time (35-peak) with no increase in peak exotherm.

Although the invention has been described in detail for the purpose of illustration, it is understood that such detail with solely for that purpose and variations can be made therein by those skilled in the art without departing from the spirit and scope of the invention which is defined by the following claims.

What is claimed is:

1. A composition comprising acetylacetone peroxide and t-butyl peroxy benzoate in a ratio of from about 30:10 to about 35:5, respectively.

2. The composition of claim 1, wherein acetylacetone peroxide and t-butyl peroxy benzoate are present in a ratio of about 30:10, respectively.

3. The composition of claim 1, wherein acetylacetone peroxide and t-butyl peroxy benzoate are present in a ratio of about 35:5, respectively.

4. The composition of claim 1, wherein said acetylacetone peroxide is present in an amount of at least 30 percent of the total composition.

5. The composition of claim 1, wherein said acetylacetone peroxide is present in an amount of from about 30 percent to about 35 percent.

6. The composition of claim 1, wherein said t-butyl peroxy benzoate is present in an amount of about 10 percent.

7. The composition of claim 1, wherein said composition further comprises diacetone alcohol or n-methyl-2-pyrrolidone.

8. The composition of claim 7, wherein said composition further comprises diacetone alcohol.

9. The composition of claim 7, wherein said composition further comprises n-methyl-2-pyrrolidone.

10. A method of curing polyester resins comprising carrying out the curing process in the presence of a composition comprising acetylacetone peroxide and t-butyl peroxy benzoate in a ratio of from about 30:10 to about 35:5, respectively.

11. The method of claim 10, wherein acetylacetone peroxide and t-butyl peroxy benzoate are present in a ratio of about 30:10, respectively.

12. The method of claim 10, wherein acetylacetone peroxide and t-butyl peroxy benzoate are present in a ratio of about 35:5, respectively.

13. The method of claim 10, wherein said acetylacetone peroxide is present in an amount of at least 30 percent of the total composition.

14. The method of claim 10, wherein said acetylacetone peroxide is present in an amount of from about 30 percent to about 35 percent.

15. The method of claim 10, wherein said t-butyl peroxy benzoate is present in an amount of about 10 percent.

16. The method of claim 10, wherein said composition further comprises diacetone alcohol or n-methyl-2-pyrrolidone.

17. The method of claim 16, wherein said composition further comprises diacetone alcohol.

18. The method of claim 16, wherein said composition further comprises n-methyl-2-pyrrolidone.

* * * * *